United States Patent [19]
DeAngelis et al.

[11] Patent Number: 5,903,883
[45] Date of Patent: May 11, 1999

[54] PHASE DETECTION USING NEURAL NETWORKS

[75] Inventors: Christopher M. DeAngelis, Cranton; Robert C. Higgins, Tiverton, both of R.I.

[73] Assignee: The United States of America as represented by the Secretary of the Navy, Washington, D.C.

[21] Appl. No.: 08/814,064

[22] Filed: Mar. 10, 1997

[51] Int. Cl.$^6$ .................................................. G06F 15/18
[52] U.S. Cl. ................................. 706/17; 706/15; 706/22; 706/24; 367/133; 367/135
[58] Field of Search .................................. 706/15, 16, 17, 706/20, 22, 24, 25; 342/90; 367/87, 131, 133, 135, 124, 125, 901

[56] References Cited

U.S. PATENT DOCUMENTS

| | | | |
|---|---|---|---|
| 5,103,431 | 4/1992 | Freeman et al. | 367/135 |
| 5,146,541 | 9/1992 | Speidel | 706/22 |
| 5,276,770 | 1/1994 | Castelaz | 706/25 |
| 5,630,019 | 5/1997 | Kochi | 706/20 |

OTHER PUBLICATIONS

J.C. Solinsky et al. "Neural–network performance assessment in sonar applications," 1991 IEEE Conference on Neural Networks for Ocean Engineering, pp. 1–12, Aug. 1991.

F.L. Casselman et al. "A neural network–based passive sonar detection and classification design with a low false alarm rate," 1991 IEEE Conference on Neural Networks for Ocean Engineering pp. 49–55, Aug. 1991.

T. Bucciarelli et al., "Neural networks based signal detection," Proceedings of the IEEE 1993 National Aerospace and Electronics Conference, vol. 2, pp. 814–818, May 1993.

*Primary Examiner*—Tariq R. Hafiz
*Assistant Examiner*—Jason W. Rhodes
*Attorney, Agent, or Firm*—Michael J. McGowan; Prithvi C. Lall; Robert W. Gauthier

[57] ABSTRACT

A likelihood of detecting a reflected signal characterized by phase discontinuities and background noise is enhanced by utilizing neural networks to identify coherency intervals. The received signal is processed into a predetermined format such as a digital time series. Neural networks perform different tests over arbitrary testing intervals to determine the likelihood of a phase discontinuity occurring in any such interval. An integration time generator subsequently uses this information to define a series of contiguous coherency intervals over the duration of the received signal. These coherency intervals are then used for piece-wise processing of the received signal by parallel quadrature receivers. The outputs are combined and processed for detecting the presence of the reflected signal.

23 Claims, 4 Drawing Sheets

PHASE DETECTION USING NEURAL NETWORKS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

This invention generally relates to the detection of a signal and more specifically to a method and apparatus for estimating and utilizing phase discontinuities to better detect the presence of a corrupted signal in background noise.

2. Description of the Prior Art

In many applications involving energy transmitted through some medium to be reflected off an object, the signals representing the received reflected energy are characterized by phase discontinuities and background noises. In a sonar system, a transmitted acoustic energy pulse travels through the water, reflects off an object and returns to a receivers. Typically the object is not uniform in shape so energy may reflect along a number of different axes from the objects. Moreover, each of these reflections may travel back to the receiver through diverse paths caused by reflections from different thermal layers in the waters the water surface or the sea bottom. Consequently the reflected signal is corrupted with phase discontinuities caused by the diverse arrival times of these reflections along paths of different length. Moreover, it is often made more difficult to detect the signal because the reflected signal is further burdened with noise accumulated as the signal propagates through the medium.

As known, various approaches have been used to recover the true or coherent transmitted signal. For example, a single quadrature receiver has been used to integrate a received signal over an integration interval corresponding to its pulse width with some success. However, it has been demonstrated that a priori knowledge of phase discontinuities in the received signal can significantly enhance the probability of signal detection by such a detection modality. That is, knowledge of the phase discontinuities would enable a parallel quadrature receiver or other signal processing circuit to optimize its operation over coherent intervals within the received signal structure. Processing in such receivers over such coherency intervals would enhance the probability of detection over the probabilities achieved with a single quadrature receiver.

Neural networks have also been used to detect phase by detecting persistent patterns of phase in a time varying or oscillatory signals. U.S. Pat. No. 5,146,541 (1992) to Speidel discloses a signal phase pattern sensitive neural network system that employs duplicate inputs from each of its sensors to the processing elements of a first layer of a neural network. One input is always phase shifted relative to the other. This system employs a modification of a conventional Kohonen competitive learning rule that is applied by the processing and learning elements of a second layer of the neural network. Partitioned segments are then processed and a third layer of the neural network that comprises processing elements connected to the second layer processes the different segments to identify a desired characteristic of the incoming signal.

Thus the prior art discloses a need for defining coherency intervals in a received signal characterized by phase discontinuities in the signal and by background noise. The prior art also discloses the use of neural networks for discerning patterns in phase. However, there remains a need for an apparatus and a method for detecting signal phase discontinuities that may occur at random times, determining the presence and duration of coherency intervals within the received signals and utilizing these coherency intervals to enhance detection capabilities.

SUMMARY OF THE INVENTION

Therefore it is an object of this invention to provide a method and apparatus for detecting phase changes that can occur at random times within a received signal.

Another object of this invention is to provide a phase detector utilizing a neural network to recognize phase changes that occur at random times within a signal.

Still another object of this invention is to provide a method and apparatus utilizing neural networks for recognizing phase changes that occur within a signal corrupted by background noise.

Yet another object of this invention is to provide a method and apparatus utilizing neural networks and parallel quadrature receivers for enhancing the ability to detect a signal that is degraded by a combination of multiple reflections of a reflected signal and by noise sources.

In accordance with this invention a received signal representing reflected energy and characterized by signal discontinuities and noise is preprocessed into a signal having a predetermined format. Neural networks analyze the formatted signal to determine the likelihood of phase discontinuities in the reflected signal within different test intervals. This information defines coherency intervals that control the integration operation of parallel quadrature receivers for processing the received signal. The outputs of the quadrature receivers are then combined to indicate the presence or absence of the reflected transmitted signal.

BRIEF DESCRIPTION OF THE DRAWINGS

The appended claims particularly point out and distinctly claim the subject matter of this invention The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
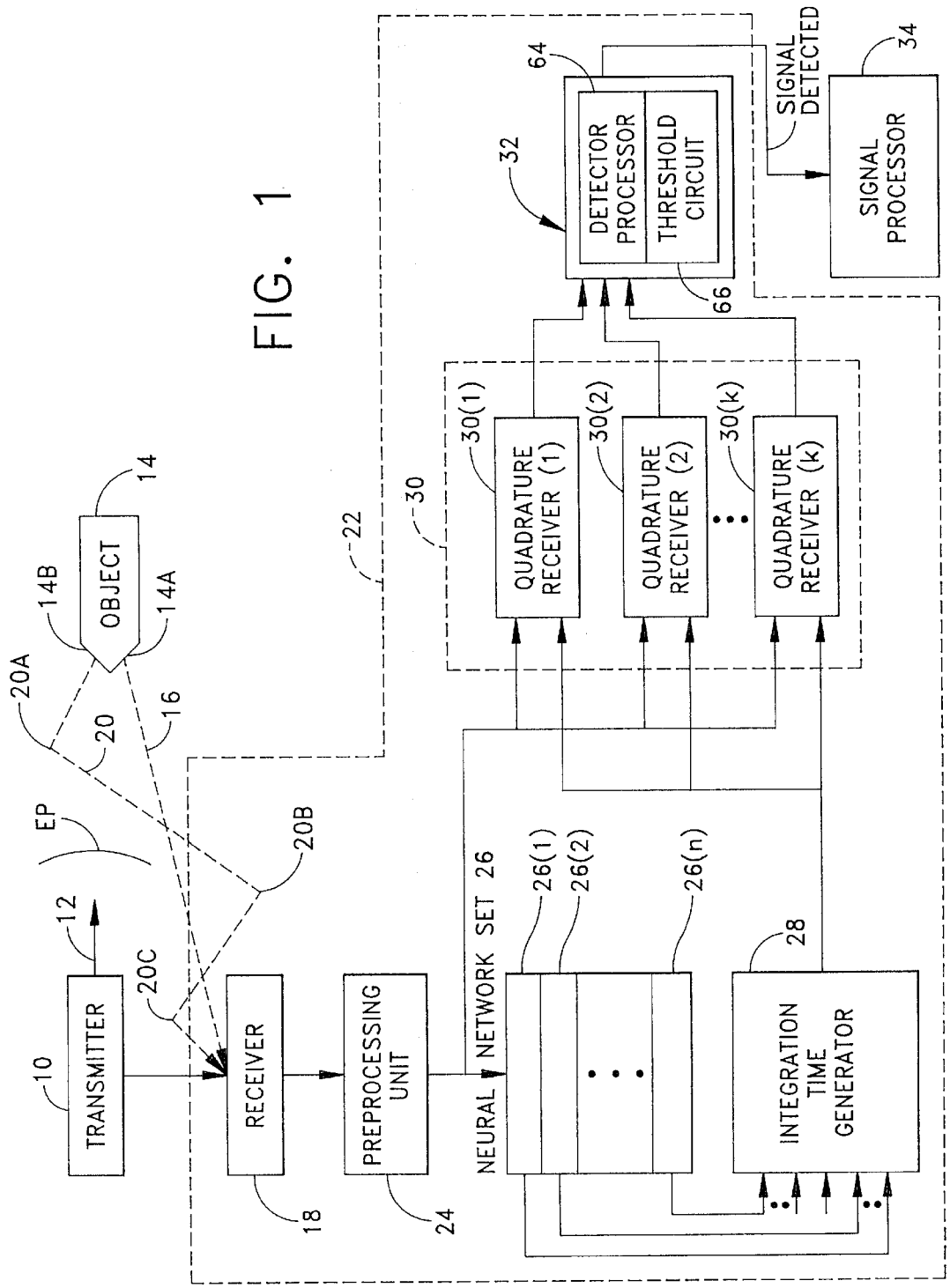
FIG. 1 is a block diagram depicting the apparatus constructed in accordance with this invention.

FIG. 1 depicts an energy transmitter 10, such as a sonar transmitters for directing an energy pulse through a medium along a path 12 as a wave EP. Typically this energy pulse will be a sinusoidal pulse with constant frequency having a predetermined pulse width. It may be focused or radiated omnidirectionally. The resulting energy travels through the medium, and a portion of the energy reflects from an object 14. In many applications the energy reflects from multiple surfaces. FIG. 1 shows facets 14A and 14B for purposes of explanation. In the specific embodiment of FIG. 1 the energy reflects from the facet 14A along a nominally direct path 16 to a receiver 18. The receiver 18 receives the reflected energy from the facet 14B after it passes along a path 20 involving multiple reflections as, for example, off the surface of water at 20A, the sea bottom at 20B or some intermediate layer at 20C. As known, the incoherent combination of these multiple reflections, that arrive at the receiver 18 at different unknown times, produces phase discontinuities in any signal representing the reflected energy. Moreover, the signal will be corrupted by noise that combines with the transmitted and reflected energy.

The receiver 18 is a component of the phase detection apparatus 22 shown in FIG. 1. The receiver 18 additionally will receive a signal corresponding to the transmitted pulse from the transmitter 10 for storage and use by the phase detection apparatus 22.

The received analog signal representing the reflected energy with its phase discontinuities and background noise from the receiver 18 is coupled to a preprocessing unit 24. The preprocessing unit 24 converts the analog signal into a digital form that constitutes a predetermined format. Generally this conversion occurs in accordance with conventional sampling theory.

A neural network set 26 in FIG. 1 comprises a plurality of neural networks 26(1), 26(2) . . . 26(n). Each of the independent neural networks is constructed to analyze an incoming signal for the likelihood of phase discontinuities occurring over the signal duration. The analysis intervals may be arbitrary, or they may be predefined depending on the design of each neural network.

As described later, the preprocessing unit 24 may filter the received signal and produce a representation of the signal in a format that is more suitable for processing. The received signal is preprocessed in accordance with the specific analysis requirements for each neural network in set 26.

An integration time generator 28 receives all the outputs from the neural network set 26. It acts to fuse the resulting information based upon the collective outputs at a particular analysis interval to determine whether it is likely that a phase discontinuity exists in any such interval. The integration time generator 28 utilizes this information to identify actual coherency intervals that, by virtue of not being likely to contain a phase discontinuity, are likely to have a coherent signal.

These actual coherency intervals control a set 30 of parallel quadrature receivers 30(1) through 30(k) where k indicates the number of multiple intervals to be processed simultaneously. Each of the quadrature receivers 30(1) through 30(k) integrates the received signal in the preprocessed format over a corresponding actual coherency interval. Thus the parallel quadrature receivers 30 operate with a priori knowledge of the phase discontinuities and integrate the signal only over actual coherency intervals in which the digitized signal from the receiver is assumed to be coherent. A detector 32 sums the quadrature receiver outputs and generates a SIGNAL DETECTED output when the sum exceeds a predetermined threshold. An optional signal processor 34 may then utilize this information to perform still other processing.

Figure 2:
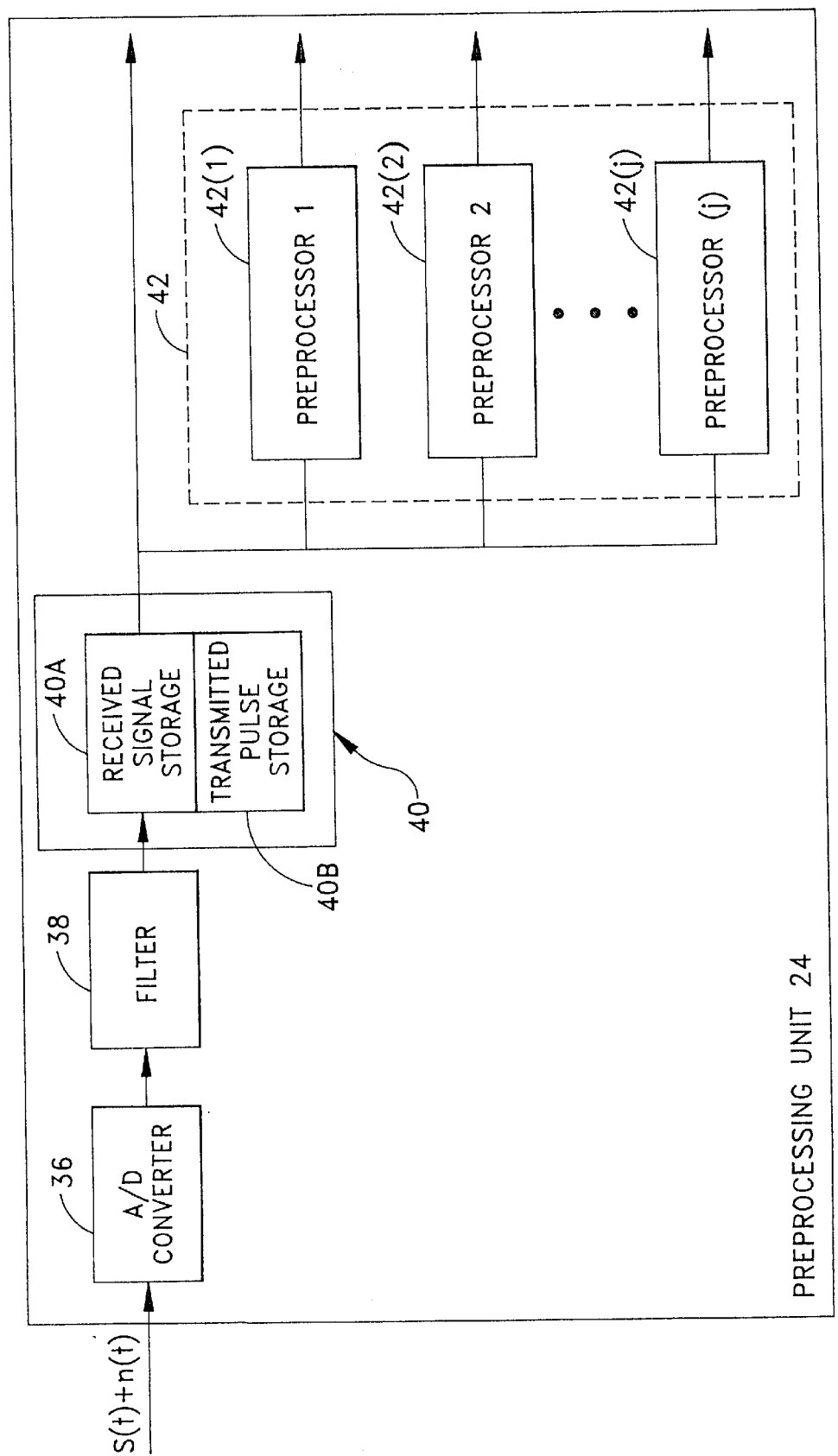
FIG. 2 is a block diagram of a preprocessor shown in FIG. 1.

Now referring to FIG. 2 the preprocessing unit 24 receives a signal S(t)+n(t) where S(t) represents the time dependent reflected signal and n(t) represents corrupting noises. In this particular embodiment an analog-to-digital (A/D) converter 36 samples and digitizes the received signal. An optional filter 38 can provide one or more functions, such as bandpass filtering, low or high pass filtering, amplitude limiting or clipping. The digitized and filtered signal is transferred to a received signal storage unit 40A of memory 40 and provides a digitized representation of the total signal {S(t)+n(t)} in the corresponding interval during which the input is active. As previously indicated the digitized signal constitutes a predetermined format of the signal.

The memory 40 also includes a transmitted pulse storage unit 40B that receives signals representing the transmitted pulse which are coupled from the transmitter 10 of FIG. 1. The receipt and storage of such transmitted signals and the use of such information for the learning operation of neural networks is known in the art.

A preprocessing unit 24 can include additional preprocessors 42(1) and 42(2) through 42(j). Each additional preprocessor in the additional preprocessor set 42 could be dedicated to producing a signal of a different format as required by each neural network. Such additional preprocessors in the additional preprocessor set 42 could produce Fourier transforms, wavelets and the like. Each would be selected on the basis of its ability to enhance the likelihood that a neural network could be configured to operate on that signal with a likelihood of detecting a phase discontinuity.

Each neural network in the neural set 26 of FIG. 1 is uniquely constructed once a particular feature (e.g., amplitude, frequency or phase) and a particular format for the input signal have been defined. In this invention where phase discontinuities are to be detected, a number of different signal formats can be processed to obtain the desired-phase information. Some of the individual neural networks, for example, might process Fast Fourier Transform information related to the received signal and obtained from one of the additional preprocessors 42(1) through 42(j) in FIG. 2 to analyze the incoming signal as a complex signal. Also, different neural networks might establish testing intervals at different times and for different durations to identify the likelihood of a phase discontinuity. Still other neural networks could be utilized as sliding windows that would process overlapping groups of subintervals or time partitions. In essence, and as generally known, each neural network compares the signal feature associated with the received signal with the feature of the known transmitted pulse thereby to determine whether it is likely that, based on the respective analysis performed, the received signal is coherent over the respective testing interval.

Figure 3:
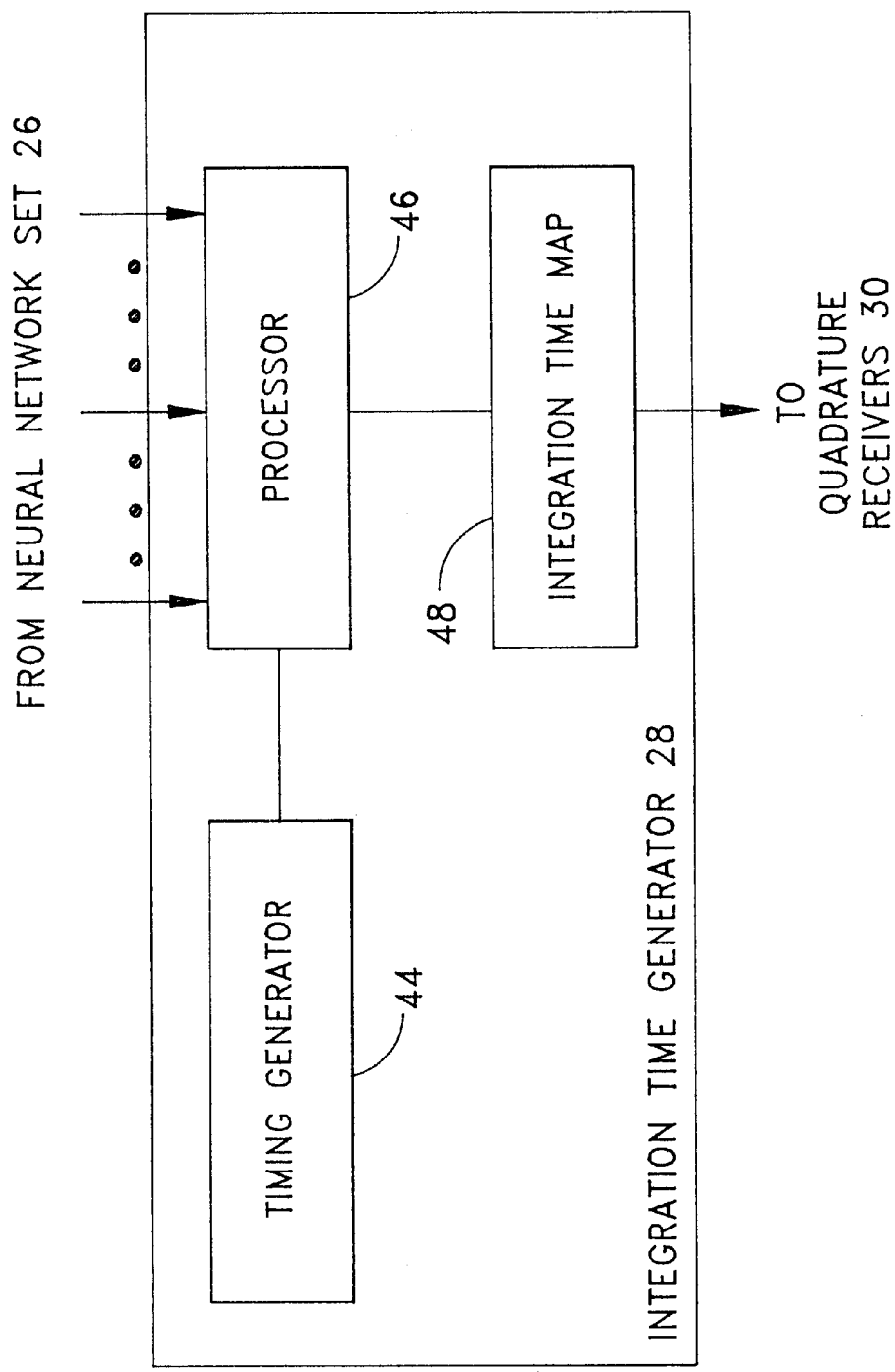
FIG. 3 is a block diagram of an integration time generator shown in FIG. 1.

FIG. 3 depicts the integration time generator 28 in more detail. A timing generator 44 defines a number of successive tentative coherency time intervals at some particular temporal resolution. An integration processor 46 then receives, during each tentative coherency interval established by the timing generator 44, the corresponding outputs from the neural network set 26. The integration processor 46 combines the resulting signals in any number of fashions. A typical application might include an "M of N" voting function; that is, if "M of N" tests indicate coherency during a particular tentative coherency interval, the integration processor 46 establishes that interval as an actual coherency interval that is appropriate for integrations. The result of this process is the generation of an integration time map 48 that, for each tentative coherency interval, indicates whether the received signal has a likelihood of coherency during a particular interval such that one of the quadrature receivers in the quadrature receiver set 30 should operate over the interval Although FIG. 3 depicts a particular embodiment, it will be apparent that the integration time generator 28 could be varied to analyze the outputs of the neural networks in a different fashion.

Figure 4:
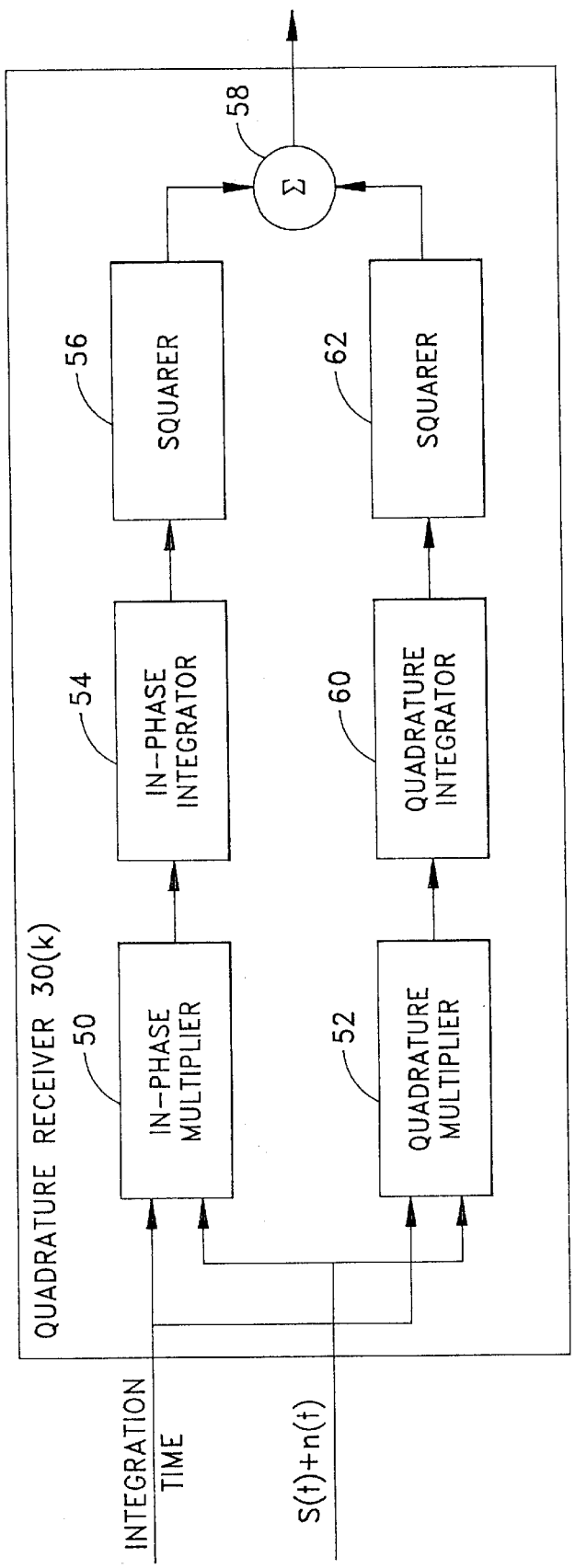
FIG. 4 is a block diagram of a quadrature receiver shown in FIG. 1.

FIG. 4 depicts a typical quadrature receiver 30(k) as one of the parallel quadrature receivers in the set 30 operating on its respective part of the integration time map. The quadrature receiver 30(k) includes an in-phase (sine wave) multiplier 50 and a quadrature (cosine wave) multiplier 52 that process the incoming signal over each actual coherency interval. The sinusoidal multipliers are characterized by the frequency of the transmit signal. In accordance with known quadrature receiver operation, an in-phase integrator 54 and squarer 56 sequentially process the signal from the multiplier 50 to be an input to a summing circuit 58. Similarly a quadrature integrator 60 and squarer 62 process the output from the quadrature multiplier 52 to be applied as a second input to the summing circuit 58. The resulting output from the quadrature receiver 30(k) becomes one of the inputs to the detector 32 in FIG. 1.

Still referring to FIG. 1, in this specific embodiment, the detector 32 comprises a detector processor 64 for combining (e.g., summing) the outputs of the parallel quadrature receiver set 30 and a threshold circuit 66. Thus the detector 32 produces a SIGNAL DETECTED signal whenever the processed outputs of the quadrature receiver set 30 exceeds a certain threshold established by the threshold circuit 66.

Generally, therefore, the transmitter 10 in FIG. 1 generates an acoustic pulse that travels along a path 12 to reflect from facets on the object 14. When the receiver 18 in FIG. 1 is on the input is either noise n(t) or signal embedded in noise S(t)+n(t). In an ideal case without the presence of background noise, the reflected signal is characterized by several intervals of constant phase and amplitude interrupted by phase discontinuities caused as a result of the different arrival times of the reflected energy. More realistically, background noise, such as white Gaussian noise, is present. The signal phase and amplitude may be affected by the noise to such an extent that the discontinuities in phase are not readily discernible.

The preprocessing unit 24 and neural networks 26 analyze this signal to identify the times when the signal phase changes. Specifically each neural network processes a received signal at different subintervals or testing intervals in an attempt to detect phase discontinuities. The resulting timing of likely phase discontinuities establishes coherency intervals where the phase is constant. These actual coherency intervals then control the receivers of the parallel quadrature receiver set 30 that perform piece-wise integrations on the received signal from the preprocessing unit 24. Stated differently, the quadrature receivers utilize the actual coherency intervals to perform the piece-wise integration over intervals of constant phase to enhance the probability of detection.

Each neural network 26(1) through 26(n) implements well known back propagation architectures or other appropriate supervised learning paradigms. Each network is trained to determine if a phase change occurs within an assigned or corresponding testing interval. In one configuration, for example, the number of neural network outputs corresponds to a number of partitions or analysis intervals. Each output is either at a "1" or "0" indicating the presence of a phase change versus no phase change. Thus the combination of the neural network outputs estimates integration times which in turn define coherency intervals over which the parallel quadrature receiver set 30 processes the received waveform. For example, if the neural network outputs indicate that a phase change has occurred at t/2 then the integration time generator 28 would set the integration intervals to 0 to t/2 and t/2 to t. Thus the use of the neural networks in the neural network set 26 enhances the likelihood of detecting phase discontinuities; and the integration time generator 28 limits processing by the receivers of quadrature receiver set 30 to subintervals in which there is a strong likelihood that the signal is coherent.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. Apparatus for generating a map of coherency intervals during which an incoming signal, characterized by reflected signal discontinuities and noise, has a likelihood of coherency, said apparatus comprising:

preprocessing means for generating a received signal in response to the incoming signal;

neural network means connected to said preprocessing means for analyzing the received signal to determine the likelihood of a phase discontinuity in the reflected signal at different testing intervals; and a time generator connected to said neural network means for generating the map of coherency intervals in response to the likelihood of the presence of a phase discontinuity in a particular testing interval.

2. Apparatus as recited in claim 1 wherein said incoming signal is in analog form, said preprocessing means including an analog-to-digital converter for generating the received signal.

3. Apparatus as recited in claim 2 wherein:

said neural network means analyze signals in predetermined formats; and said preprocessing means additionally includes a format processor for generating a representation of the received signal in at least two predetermined formats, said neural network means being responsive to the received signal in each of the predetermined formats.

4. Apparatus as recited in claim 3 wherein said preprocessing means includes a filter for performing at least one filtering function on the received signal.

5. Apparatus as recited in claim 1 wherein said neural network means comprises a plurality of neural networks, each network examining a signal for the likelihood of a phase discontinuity over one of the particular testing intervals.

6. Apparatus as recited in claim 5 further comprising a plurality of parallel processors for processing the received signal, each of the parallel processors being coupled to said time generator for being active during a corresponding coherency interval.

7. Apparatus for detecting a reflection of a transmitted signal in a received signal characterized by reflected signal discontinuities and noise, said apparatus comprising:

a preprocessor for converting the received signal into a predetermined format;

a plurality of neural networks connected to said preprocessor, each said neural network analyzing a signal derived from the predetermined format to determine the likelihood of a phase discontinuity in the reflected transmitted signal at different testing intervals;

a time generator connected to said plurality of neural networks for generating coherency intervals in response to the likelihood of the presence of a phase discontinuity in a particular testing interval;

parallel quadrature receivers connected to said time generator and said preprocessor for processing the received signal in the predetermined format over the coherency intervals; and a detector for combining the output of said quadrature receivers to indicate the presence of the reflected transmitted signal.

8. Apparatus as recited in claim 7 wherein the received signal is in analog form and said preprocessor includes an analog-to-digital converter for generating the signal in the predetermined format.

9. Apparatus as recited in claim 8 wherein said preprocessor includes a format processor for generating a representation of the received signal in at least one additional format, certain of said neural networks being responsive to the received signal in each format.

10. Apparatus as recited in claim 9 wherein said preprocessor includes a filter for performing at least one filtering function on the received signal.

11. Apparatus as recited in claim 7 wherein said time generator produces a coherency map in response to the outputs from said plurality of neural networks and wherein each of said parallel quadrature receivers individually process the received signal during at least one coherency interval defined in the coherency map.

12. Apparatus as recited in claim 7 wherein said detector includes:

means for combining the outputs from said plurality of parallel quadrature receivers; and means for determining whether the processed output exceeds a threshold.

13. A method for generating a map of times during which an incoming signal, characterized by reflected signal discontinuities and noise, is coherent, said method comprising the steps of:

generating a received signal in response to the incoming signal;

analyzing the received signal in a plurality of neural networks to determine the timing of the likelihood of phase discontinuities in the received signal; and generating, in response to said neural network analysis, the coherency map identifying testing intervals during which it is likely that the incoming signal is coherent.

14. A method as recited in claim 13 wherein the incoming signal is in analog form and said received signal generating step includes converting the received signal to a digital format.

15. A method as recited in claim 14 wherein said received signal generating step includes generating a representation of the received signal in at least one additional format, said testing in the neural networks being responsive to the received signal in each of the formats.

16. A method as recited in claim 15 wherein said received signal generating step includes performing at least one filtering function on the received signal.

17. A method as recited in claim 13 wherein each neural network examines a signal for the likelihood of a phase discontinuity over at least one predetermined testing interval.

18. A method as recited in claim 17 additionally comprising the parallel quadrature processing of the received signal each quadrature processing occurring during an interval determined by the coherency map.

19. A method for detecting a reflection of a transmitted signal in a received signal characterized by reflected signal discontinuities and noise, said method comprising the steps of:

preprocessing the received signal into a predetermined format;

conducting a plurality of analyses on the received signal in at least the predetermined format in a plurality of neural networks, each neural network determining the likelihood of a phase discontinuity in the reflected transmitted signal at different testing intervals;

generating coherency intervals in response to the likelihood of the presence of a phase discontinuity in a particular testing interval in response to said analyses;

processing the received signal in the predetermined format in a plurality of parallel quadrature receivers over one of the coherency intervals; and combining the processed signals to detect the presence of the reflected transmitted signal.

20. A method as recited in claim 19 wherein the received signal is in analog form and said preprocessing includes converting the received signal to digital form as the predetermined format.

21. A method as recited in claim 20 wherein:

said preprocessing step generates a representation of the received signal in at least one additional format; and said neural network analyses step responds to the received signal in each of the formats.

22. A method as recited in claim 21 wherein said preprocessing includes performing at least one filtering function on the received signal.

23. A method as recited in claim 19 wherein said coherency interval processing step includes the step of determining whether the processed output exceeds a threshold.

* * * * *